(12) United States Patent
Worrall, III et al.

(10) Patent No.: US 7,026,573 B2
(45) Date of Patent: Apr. 11, 2006

(54) METHODS FOR PRODUCING GLASS SUBSTRATES FOR USE IN BIOPOLYMERIC MICROARRAYS

(75) Inventors: Joseph A. Worrall, III, Ben Lomond, CA (US); Alexander S. Williamson, Palo Alto, CA (US); John F. McEntee, Boulder Creek, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 11/069,833

(22) Filed: Feb. 28, 2005

(65) Prior Publication Data

US 2005/0150881 A1     Jul. 14, 2005

Related U.S. Application Data

(63) Continuation of application No. 10/106,132, filed on Mar. 25, 2002, now Pat. No. 6,919,531.

(51) Int. Cl.
*B23K 26/00* (2006.01)

(52) U.S. Cl. .................. 219/121.72; 219/121.67; 219/121.85

(58) Field of Classification Search .......... 219/121.72, 219/121.69, 121.68, 121.67, 121.85; 435/6, 435/287.2

See application file for complete search history.

(56) References Cited

U.S. PATENT DOCUMENTS

| | | | |
|---|---|---|---|
| 3,112,850 A | 12/1963 | Garibotti | |
| 3,453,097 A * | 7/1969 | Hafner | ...................... 65/112 |
| 3,615,047 A | 10/1971 | Feldman et al. | |
| 3,629,545 A | 12/1971 | Graham et al. | |
| 4,467,168 A | 8/1984 | Morgan et al. | |
| 4,535,218 A | 8/1985 | Krause et al. | |
| 4,877,481 A | 10/1989 | Fukuda et al. | |
| 5,091,626 A | 2/1992 | Lewis et al. | |
| 5,166,492 A | 11/1992 | Rivera | |
| 5,211,805 A | 5/1993 | Srinivasan | |
| 5,214,261 A | 5/1993 | Zappella | |
| 5,316,743 A | 5/1994 | LeBlanc et al. | |
| 5,776,220 A | 7/1998 | Allaire et al. | |
| 5,807,522 A | 9/1998 | Brown et al. | |
| 5,961,852 A | 10/1999 | Rafla-Yuan et al. | |
| 6,211,488 B1 * | 4/2001 | Hoekstra et al. | ....... 219/121.72 |
| 6,327,875 B1 | 12/2001 | Allaire et al. | |
| 6,660,963 B1 | 12/2003 | Hoekstra et al. | |

FOREIGN PATENT DOCUMENTS

| | | |
|---|---|---|
| WO | WO00/66507 | 11/2000 |
| WO | WO01/38039 | 11/2000 |
| WO | WO01/32571 | 5/2001 |
| WO | WO01/42152 | 6/2001 |
| WO | WO01/73506 | 10/2001 |
| WO | WO01/74726 | 10/2001 |

* cited by examiner

*Primary Examiner*—M. Alexandra Elve

(57) ABSTRACT

Methods for producing glass substrates having scribed edges with straight and smooth ends substantially free of edge protrusions, and microarray glass substrates produced thereby, are provided. In certain embodiments, at least one scribe line is scribed in glass using reduced laser power at the beginning and end of each scribe line relative to the laser power used to scribe the remaining portions of each respective scribe line. In other embodiments, a heat absorbing laser element is positioned adjacent the beginning and end of each scribe line. In all embodiments, the scribed glass is singulated to produce a plurality of scribed glass pieces, each having straight and smooth ends substantially free of edge protrusions. The scribed glass can be used as substrates for biopolymeric microarrays. Also provided are biopolymeric microarrays produced from the subject methods and kits which include the subject microarrays, as well as methods for using the same.

10 Claims, 6 Drawing Sheets

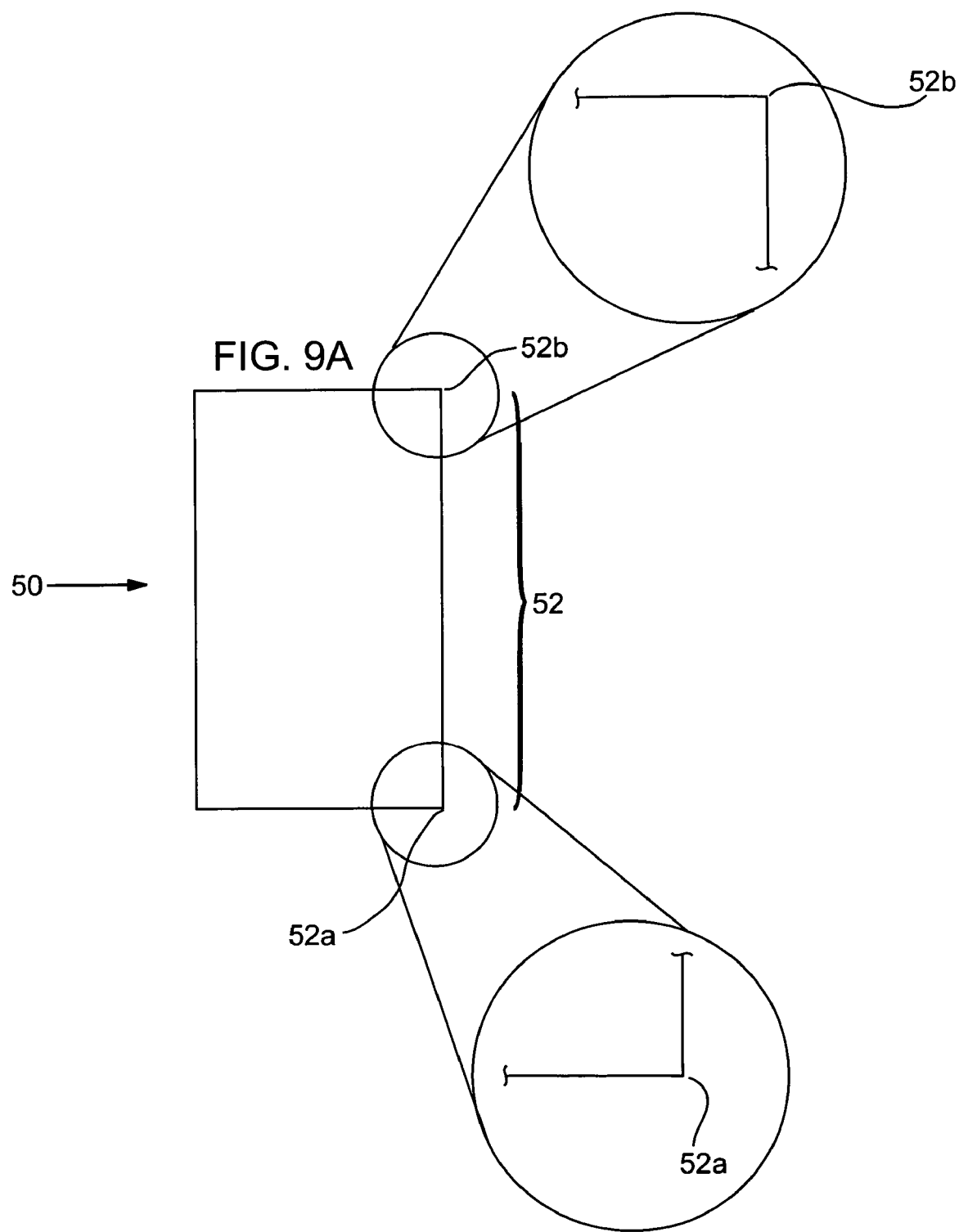

METHODS FOR PRODUCING GLASS SUBSTRATES FOR USE IN BIOPOLYMERIC MICROARRAYS

CROSS-REFERENCE TO RELATED APPLICATIONS

This application is a continuation of application Ser. No. 10/106,132 filed on Mar. 25, 2002, now U.S. Pat. No. 6,919,531; the disclosure of which is herein incorporated by reference.

BACKGROUND OF THE INVENTION

"Biochips" or arrays of binding agents, such as oligonucleotides, cDNA and peptides, and the like have become an increasingly important tool in the biotechnology industry and related fields. These binding agent arrays, in which a plurality of binding agents, i.e., ligands or molecules, are deposited onto a solid support surface in the form of an array or pattern, find use in a variety of applications, including gene expression analysis, drug screening, nucleic acid sequencing, mutation analysis, and the like.

In many instances, the solid support surface upon which the binding agents are deposited is a glass substrate. In order to produce these glass substrates, and in particular a plurality of glass substrates, usually a large precursor sheet of glass is scribed and then broken into a plurality of smaller pieces, where the smaller pieces are used as the substrates upon which substances are deposited, as described above. Scribing involves cutting the glass to form a groove therein, where the groove may be formed by removing material from the glass or may be formed by reconfiguring the glass to create a groove. Precursor glass suitable for use with biopolymeric microarrays can be scribed using a variety of means including, but not limited to, mechanical protocols that employ natural diamonds, carbide wheels and lasers.

In using, for example, a diamond to scribe glass, a sharp point of a diamond physically contacts the glass to make a cut therein. However, while the use of diamonds is effective to scribe and singulate glass, it presents numerous problems. First and foremost, the diamond undergoes wear during use, which eventually results in the deterioration of its scribing abilities. For example, ineffective scribe depths may result and/or the scribed edges may decline in quality causing cracks, all of which may result in unusable glass.

To ensure that deteriorated diamonds are not used, it is incumbent upon an operator to constantly inspect the diamonds in attempts to detect the deterioration before it becomes too severe. This manual detection process requires the system to be shut down, resulting in increased costs and time delays. Furthermore, all too often the inspections are inadequate or untimely, ultimately resulting in glass breakage as a result of the ineffectively scribed glass. Additionally, scribing glass with diamonds oftentimes produces microfractures that can propagate perpendicularly outward from the scribe line which weaken the glass. Another significant disadvantage is that diamond scribing also produces glass shards which oftentimes end up on the surface of the glass contaminating it, for example when the glass is used as a substrate for microarrays.

Likewise, for reasons analogous to those described above for diamonds, carbide particles also present numerous problems for scribing glass.

In light of the above described problems associated with the use of diamonds and carbide particles to scribe glass, lasers have become an increasingly popular tool to scribe glass. However, while effective at producing precise and reproducible scribe lines, laser glass scribing oftentimes produces protrusions at the edges of the scribed glass. FIGS. 1 and 2 show a prior art method of scribing glass using a laser and the glass pieces produced thereby. FIG. 1 shows a precursor glass sheet 2. To scribe the glass, a laser enters the sheet at an entrance point 1 to begin the scribe line 4 and exits at the end of the scribe line at an exit point 3. This is repeated for each scribe 4, i.e., for each proposed glass edge, so that a plurality of glass pieces are produced, each having a primary or intended width 70. FIG. 2 shows an individual piece of glass singulated or broken apart from the precursor glass sheet of FIG. 1. As shown in FIG. 2, at the laser beam's entrance and exit from the glass sheet, i.e., at the beginning and ending of the scribe line, laterally extending, substantially planar edge protrusions 100 and 102 (i.e., the protrusions may less than or the same thickness of the glass) are produced due to the laser acting upon the glass. Accordingly, primary width 70 is extended or increased by dimension 72. Such protrusions may vary in dimensions, i.e., may vary in the magnitude of the dimension, depending on the size of the precursor glass, the power of the laser, etc. However, typically a protrusion will increase the primary width, i.e., the intended width, of the scribed glass by as much as about 100 microns to about 350 microns.

These edge protrusions are reproduced at the beginning and ending of each scribed line or edge, causing decreased yields, inconsistent edge quality (which may be a source of cracks) and storage and/or packaging problems due to the irregular and inconsistent shapes. To physically remove such protrusions from the ends of the glass results in time delays and increased costs and may further weaken the glass.

As such, there is continued interest in the development of new methods that employ lasers to scribe glass having straight, smooth edges substantially free of edge protrusions. Of particular interest would be the development of such methods that are easy and inexpensive to use, do not interfere with the surface of the glass precursor sheet and do not produce the above described protrusions.

SUMMARY OF THE INVENTION

Methods for producing glass substrates having scribed edges with straight and smooth ends substantially free of edge protrusions, and microarray glass substrates produced thereby, are provided. In certain embodiments, at least one scribe line is scribed in a glass sheet using reduced laser power at the beginning and end of each scribe line relative to the laser power used to scribe the remaining portions of each respective scribe line. In other embodiments, a heat absorbing laser element is positioned adjacent the beginning and end of each scribe line. In all embodiments, the scribed glass is singulated to produce a plurality of scribed glass pieces, each having straight and smooth ends substantially free of edge protrusions. The scribed glass can be used as substrates for biopolymeric microarrays. Also provided are biopolymeric microarrays produced from the subject methods and kits which include the subject microarrays, as well as methods for using the same.

BRIEF DESCRIPTION OF THE DRAWINGS

FIG. 9A shows an exemplary embodiment of a singulated glass substrates made according to the present invention. FIGS. 9B and 9C are enlarged views of the straight and smooth ends that are substantially free of edge protrusions of the singulated glass substrate of FIG. 9A.

DEFINITIONS

Figure 1:
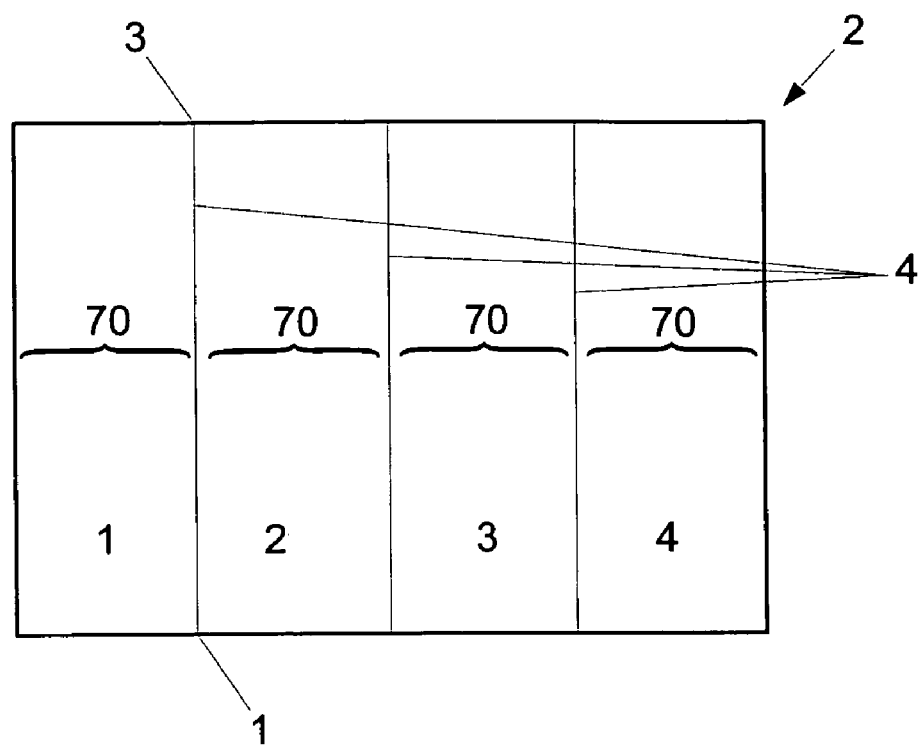
FIG. 1 shows a glass precursor sheet suitable for laser scribing.

The term "polymer" means any compound that is made up of two or more monomeric units covalently bonded to each other, where the monomeric units may be the same or different, such that the polymer may be a homopolymer or a heteropolymer.

Representative polymers include peptides, polysaccharides, nucleic acids and the like, where the polymers may be naturally occurring or synthetic.

The term "monomer" as used herein refers to a chemical entity that can be covalently linked to one or more other such entities to form an oligomer. Examples of "monomers" include nucleotides, amino acids, saccharides, peptides, and the like. In general, the monomers used in conjunction with the present invention have first and second sites (e.g., C-termini and N-termini, or 5' and 3' sites) suitable for binding to other like monomers by means of standard chemical reactions (e.g., condensation, nucleophilic displacement of a leaving group, or the like), and a diverse element which distinguishes a particular monomer from a different monomer of the same type (e.g., an amino acid side chain, a nucleotide base, etc.). The initial substrate-bound monomer is generally used as a building-block in a multi-step synthesis procedure to form a complete ligand, such as in the synthesis of oligonucleotides, oligopeptides, and the like.

The term "oligomer" is used herein to indicate a chemical entity that contains a plurality of monomers. As used herein, the terms "oligomer" and "polymer" are used interchangeably. Examples of oligomers and polymers-include polydeoxyribonucleotides, polyribonucleotides, other polynucleotides which are B or C-glycosides of a purine or pyrimidine base, polypeptides, polysaccharides, and other chemical entities that contain repeating units of like chemical structure.

The term "ligand" as used herein refers to a moiety that is capable of covalently or otherwise chemically binding a compound of interest. The ligand may be a portion of the compound of interest. Typically, when the present substrates are used, they are used so that "ligands" are synthesized thereon. These solid-supported ligands can then be used in screening or separation processes, or the like, to bind a component of interest in a sample. The term "ligand" in the context of the invention may or may not be an "oligomer" as defined above. The term "ligand" as used herein may also refer to a compound that is synthesized on the substrate surface as well as a compound is "pre-synthesized" or obtained commercially, and then attached to the substrate surface.

The terms "array" "biopolymeric array" and "microarray" are used herein interchangeably to refer to an arrangement of ligands or molecules of interest on a substrate surface which can be used for analyte detection, combinatorial chemistry, or other applications wherein a two-dimensional arrangement of molecules of interest can be used. That is, the terms refer to an ordered pattern of probe molecules adherent to a substrate, i.e., wherein a plurality of molecular probes are bound to a substrate surface and arranged in a spatially defined and physically addressable manner. Such arrays may be comprised of oligonucleotides, peptides, polypeptides, proteins, antibodies, or other molecules used to detect sample molecules in a sample fluid.

The term "biomolecule" means any organic or biochemical molecule, group or species of interest which may be formed in an array on a substrate surface. Exemplary biomolecules include peptides, proteins, amino acids and nucleic acids.

The term "peptide" as used herein refers to any compound produced by amide formation between a carboxyl group of one amino acid and an amino group of another group.

The term "oligopeptide" as used herein refers to peptides with fewer than about 10 to 20 residues, i.e. amino acid monomeric units.

The term "polypeptide" as used herein refers to peptides with more than 10 to 20 residues.

The term "protein" as used herein refers to polypeptides of specific sequence of more than about 50 residues.

The term "nucleic acid" as used herein means a polymer composed of nucleotides, e.g. deoxyribonucleotides or ribonucleotides, or compounds produced synthetically (e.g. PNA as described in U.S. Pat. No. 5,948,902 and the references cited therein) which can hybridize with naturally occurring nucleic acids in a sequence specific manner analogous to that of two naturally occurring nucleic acids, e.g., can participate in Watson-Crick base pairing interactions.

The terms "ribonucleic acid" and "RNA"s used herein mean a polymer composed of ribonucleotides.

The terms "deoxyribonucleic acid" and "DNA" as used herein mean a polymer composed of deoxyribonucleotides.

The term "oligonucleotide" as used herein denotes single stranded nucleotide multimers of from about 10 to 100 nucleotides and up to 200 nucleotides in length.

The term "polynucleotide" as used herein refers to single or double stranded polymer composed of nucleotide monomers of generally greater than 100 nucleotides in length.

The term "sample" as used herein relates to a material or mixture of materials, typically, although not necessarily, in fluid form, containing one or more components or analytes of interest.

The terms "nucleoside" and "nucleotide" are intended to include those moieties which contain not only the known purine and pyrimidine bases, but also other heterocyclic bases that have been modified. Such modifications include methylated purines or pyrimidines, acylated purines or pyrimidines, or other heterocycles. In addition, the terms "nucleoside" and "nucleotide" include those moieties that contain not only conventional ribose and deoxyribose sugars, but other sugars as well. Modified nucleosides or nucleotides also include modifications on the sugar moiety, e.g., wherein one or more of the hydroxyl groups are replaced with halogen atoms or aliphatic groups, or are finctionalized as ethers, amines, or the like.

DETAILED DESCRIPTION OF THE INVENTION

Methods for producing glass substrates having scribed edges with straight and smooth ends substantially free of edge protrusions, and microarray glass substrates produced thereby, are provided. In certain embodiments, at least one scribe line is scribed in a glass sheet using reduced laser power at the beginning and end of each scribe line relative to the laser power used to scribe the remaining portions of each respective scribe line. In other embodiments, a heat absorbing laser element is positioned adjacent the beginning and end of each scribe line. In all embodiments, the scribed glass is singulated to produce a plurality of scribed glass pieces, each having straight and smooth ends substantially free of edge protrusions. The scribed glass can be used as substrates for biopolymeric microarrays. Also provided are biopolymeric microarrays produced from the subject methods and kits which include the subject microarrays, as well as methods for using the same.

Before the present invention is described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed-within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural referents unless the context clearly dictates otherwise. Thus, for example, reference to "a composition" includes a plurality of such compositions and reference to "the array" includes reference to one or more arrays and equivalents thereof known to those skilled in-the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

In further describing the subject invention, the subject methods are described first, as well as the glass array substrates produced by the subject methods. Next, microarrays made with the subject substrates are described. Following this section, methods of using the subject arrays and kits that include the same are reviewed.

Methods of Manufacture and Substrates Produced Thereby

As summarized above, the subject invention provides methods for producing glass substrates by laser scribing and singulating a glass sheet or glass precursor, where such methods produce a plurality of glass pieces, i.e., substrates, from the laser scribed and singulated glass sheet, each glass piece having straight and smooth ends substantially free of protrusions on the laser scribed edges. In other words, the subject methods provide a means for fabricating glass substrates having edge quality sufficient for its intended purpose, i.e., the edges do not include unintended, substantial laser-induced bumps or protrusions. The glass produced from the subject methods can be used as substrates for arrays such as biopolymeric microarrays. In general, the subject methods are characterized by scribing a sheet of glass, i.e., a precursor glass sheet, with a laser. By scribe is meant to make a cut having a certain depth positioned in the glass sheet. Typically, the cut is made without removing or ablating any of the glass material. After it is scribed, the glass sheet is then singulated by application of a suitable force at the site of a scribe line to produce a plurality of glass pieces having straight and smooth ends substantially free of protrusions at the scribed edges, each piece of singulated, scribed glass being of a functionally relevant size, the particular size dependent upon the particular purpose for which the glass is to be used, e.g., the number of arrays produced thereon, etc.

In practicing the subject methods, the first step is the provision of a suitable sheet of glass, i.e., a precursor sheet of siliceous material. In certain embodiments, the glass may be doped glass, for example the glass may-be doped with borosilicate, and the like, or the glass may have a coating or layer thereon.

The size and shape of the particular glass sheet, and the singulated glass pieces produced therefrom, may vary. For example, the glass sheet may assume a variety of shapes ranging from simple to complex. Thus, the glass sheets may have a rectangular, square, circular, elliptical, oval, oblong or disc configuration. In other embodiments, the glass sheets may have an irregular shape.

The size of the glass sheet to be scribed by a laser also varies, as mentioned above. By way of example and not limitation, in those embodiments where each singulated glass piece produced from the subject methods has a rectangular shape with a width ranging from about 10 mm to about 40 mm, usually from about 15 mm to about 35 mm and more usually from about 20 mm to about 30 mm, a length ranging from about 60 mm to about 90 mm, usually from about 65 mm to about 85 mm and more usually from about 70 mm to about 80 mm and a thickness ranging from about 0.85 mm to about 1.30 mm, usually from about 0.85 mm to about 1.15 mm and more usually from about 0.90 mm to about 1.15 mm, the precursor glass sheet will usually, although not necessarily, have dimensions correlating to the dimensions of the final singulated glass pieces, depending on the number of glass pieces desired. For example, if about 12 glass pieces having dimensions of about 25 mm by about 75 mm by about 1 mm are desired to be produced from the glass precursor sheet, then depending on the variation or tolerances in the dimensions and any scrap that may be produced as is common in manufacturing processes, the precursor glass sheet will usually have dimensions of about 150 mm by about 165 mm by about 1 mm, and may in certain embodiments have dimensions of about 150 mm by about 150 mm by about 1 mm. The above dimensions are, of course, exemplary only and may vary as appropriate. For example, where each singulated glass piece produced from the subject methods has a rectangular shape with a width ranging from about 10 mm to about 40 mm, usually from about 15 mm to about 35 mm and more usually from about 20 mm to about 30 mm, a length ranging from about 60 mm to about 90 mm, usually from about 65 mm to about 85 mm and more usually from about 70 mm to about 80 mm and a thickness ranging from about 0.25 mm to about 0.85 mm, usually from about 0.30 mm to about 0.75 mm and more usually from about 0.45 mm to about 0.55 mm, the precursor glass sheet will usually, although not necessarily, have dimensions correlating to the dimensions of the final singulated glass pieces, depending on the number of glass pieces desired. For example, if about 12 glass pieces having dimensions of about 25 mm by about 75 mm by about 0.50 mm are desired to be produced from the glass precursor sheet, then depending on the variation or tolerances in the dimensions and any scrap that may be produced as is common in manufacturing processes, the precursor glass sheet will usually have dimensions of about 150 mm by about 165 mm by about 0.50 mm, and may in certain embodiments have dimensions of about 150 mm by about 150 mm by about 0.50 mm.

The glass sheet may be produced using any convenient method, where a variety of suitable methods are known to those of skill in the art.

Following the provision of a suitable glass sheet, the glass sheet is then scribed with a laser. More specifically a laser scribes at least one scribe line or cut in the glass sheet, where such a scribe line represents an area of breakage or singulation such that the precursor glass sheet can be broken or singulated at the laser scribe line to produce one or more pieces of laser scribed glass. In all embodiments of the subject methods, the laser uses a plurality of laser pulses to scribe the glass or may use one constant, uninterrupted laser pulse, but typically the laser is pulsed. Usually, a scribe line will be made without the removal of any glass from the glass sheet. More specifically, the scribe line is produced by first providing a high stress point at the beginning or start of the scribe line. This high stress area is accomplished using any suitable mechanical means. For instance, to produce a high stress point, a wheel such as a carbide wheel or the like, is contacted or "crashed" into the glass substrate with enough force to produce a gouge or nick on the edge of the glass substrate. Immediately after the provision of a high stress point is met, a laser beam enters the glass at the location of the high stress point which produces an elevated temperature on the surface of the glass. The laser beam translates across the surface of the glass followed by a spray of coolant which produces a "thermal shock" on the glass surface. Due to the initial stress point, a fissure or surface crack is produced which follows the path of the laser beam and coolant.

Typically, a $CO_2$ laser is used to scribe the glass sheet, due in part because a $CO_2$ laser has a wavelength such that the energy therefrom gets absorbed by the glass being scribed, i.e., it is capable of producing a laser beam which can scribe the glass to a suitable depth and width. The depth of the scribe line will vary, but is usually about 10% to about 30% of the total thickness of the glass sheet, although other depths are possible as well. Typically, the laser employed will be configured to produce a laser beam with a wavelength ranging from about 10.57 microns to about 10.63 microns. However, for example, for substrates made from materials other than glass, a laser having a suitable wavelength may be used with the subject invention. As noted above, a representative laser suitable for use with the subject invention include is a $CO_2$ laser.

In certain embodiments of the subject methods, the power of the laser is reduced at the beginning and the end of the scribing process. In other words, the laser's power is reduced, relative to the working laser power or scribe power, at the entrance and exit of the glass sheet, i.e., at the beginning and end of the scribe line. By working laser power or scribe power is meant the power used by the laser to scribe a scribe line in the glass sheet, other than at the entrance and exit of the glass sheet. The particular working laser power used will depend on a variety of factors such as the focus of the laser and the like. In many embodiments, the working laser power ranges from about 30 watts to about 45 watts, more usually the working laser power ranges from about 32 to about 38 watts and more usually ranges from about 35 to about 37 watts, however, the working laser power may vary as appropriate.

As described above, the power of the laser is reduced at the entrance and exit of the glass precursor sheet. That is, the laser power is reduced at the beginning and ending of the scribe line or rather the line that is to be scribed. It will be apparent that in those embodiments scribing a circular formation, the beginning and ending of the scribe line, i.e., the entrance and exit if the glass precursor sheet, may be the same point.

The amount of power reduction will vary according to a variety of factors, including, but not limited to, the actual dimensions of the glass precursor sheet used, the particular laser used, the beam oscillation, and the like. Typically, upon entrance of the glass sheet, the power of the laser is reduced from about 5% to about 60% of the working laser power, usually reduced from about 10% to about 40% of the working laser power and more usually reduced from about 10% to about 35% of the working laser power, where the reduced power at the entrance of the scribe line may be increased to reach the working laser power from the reduced laser power at the beginning of the scribe line using any convenient protocol. For example, the power may be stepped in increments, or ramped in a linear or non-linear profile or the like.

Upon exit from the glass sheet, the power of the laser is reduced from about 5% to about 60% or more of the working laser power and usually reduced from about 10% to about 40% of the working laser power, and more usually reduced from about 10% to about 35% of the working laser power. In certain embodiments, the working laser power is decreased about 100% such that the laser power is cut-off or terminated at the end of the scribe line, i.e., before the laser exits the glass sheet. The reduced power at the exit or end of the scribe line may be decreased to reach the reduced laser power from the working laser power at the end of the scribe line using any convenient protocol. For example, the power may be stepped in increments, or ramped in a linear or non-linear profile, etc.

Accordingly, using a working laser power of about 30 watts to about 45 watts and a reduced laser power of about 5% to about 60% of the working laser power, the laser power will be reduced at the beginning and ending of the scribe line to a range from about 12 watts to about 43 watts, where the laser power will be increased to the working laser power or decreased down from the working laser power, depending on whether the laser beam is at the beginning or ending of the scribe line, respectively.

The distance or length of the glass that the laser power is reduced at the beginning and ending of the scribe line will vary depending on the size of the glass precursor sheet, etc., where the distance of laser power modulation at each end of the scribe line is related or is proportional to the thickness of the glass precursor sheet. In many embodiments, the distance that the laser power is modulated at each end of the scribe line, i.e., the distance where the laser power is not the working laser power, is about the same as the thickness dimension of the glass precursor sheet.

By way of example and not limitation, using a pulsed $CO_2$ laser and a glass sheet having a width ranging from about 145 mm to about 155 mm, a length ranging from about 145 mm to about 170 mm an a thickness ranging from about 0.85 mm to about 1.30 mm, and using a working laser power that ranges from about 35 to about 37 watts, the laser power is modulated at the entrance and exit of the glass as follows. At the entrance of the glass sheet, i.e., the beginning of the scribe line, the laser power ranges from about 23 to about 27 watts. The laser is held in the range from about 23 to about 27 watts as the laser beam advances across the glass for about 0.5 to about 1.5 mm, after such time the laser power is increased to a range from about 30 to about 33 watts where it is held at this power as the laser beam advances about 0.5 to about 1.5 mm, after which time the laser power is increased to the working laser power of about 35 to about 37 watts. The working laser power is held at the working laser power of about 35 to about 37 watts until the laser beam reaches the end of the glass sheet or about 1 to about 3 mm from the exit of the glass or end of the scribe line, at which point the laser is decreased to a range from about 30 to about 33 watts. The laser power is held in a range from about 30 to about 33 watts as the laser beam advances about 0.5 to about 1.5 mm. After advancement of about 0.5 to about 1.5 mm in a range from about 30 to about 33 watts, the laser power is decreased to a range from about 23 to about 27 watts. The laser beam thus advances and exits the glass in the power range from about 23 to about 27 watts. As described above, the laser power may be increased and decreased in any convenient manner, e.g., the laser power may be stepped, as described above, or it may be ramped, either linearly or non-linearly. These numbers are exemplary only and of course may vary as appropriate.

Thus, the distance of the glass sheet on which the laser power is reduced, i.e., the distance at the beginning and ending of the scribe line that the laser beam will travel or advance at a reduced power at the beginning of the scribe line ranges from about 1 to about 3 mm, more usually from about 1 mm to about 2 mm. In regards to the power reduction when the laser beam exits the glass sheet, typically the power will be reduced at the exit of the glass sheet from about ranges from about 1 mm to about 3 mm, more usually from about 1 mm to about 2 mm.

In certain other embodiments of the subject methods, the laser power is not. reduced and, instead, remains substantially constant throughout the entire laser scribe process. In these particular embodiments, at least the beginning and ending of the scribe line, i.e., the areas of the glass precursor sheet where the laser beam enters and exits, are positioned adjacent a laser entrance element and a laser exit element, respectively. It will be obvious to one of skill in the art that certain scribe line configurations may require only a single laser element, e.g., a scribed circle, etc.

The subject laser entrance and exit elements may be positioned in any convenient manner adjacent the beginning and end of the proposed scribe lines, e.g., positioned on top of the glass sheet, i.e., adjacent the side of the glass sheet that will be laser scribed to have a scribe line, beneath the glass sheet, i.e., adjacent the side of the glass that will be not scribed or along the edges of the glass sheet where the laser beam enters and exits. Usually, the entrance elements will be positioned next to or besides the laser beam entrance and exit edges of the glass sheet so as not to interfere or adversely affect the top and bottom surfaces of the glass sheet.

Figure 3:
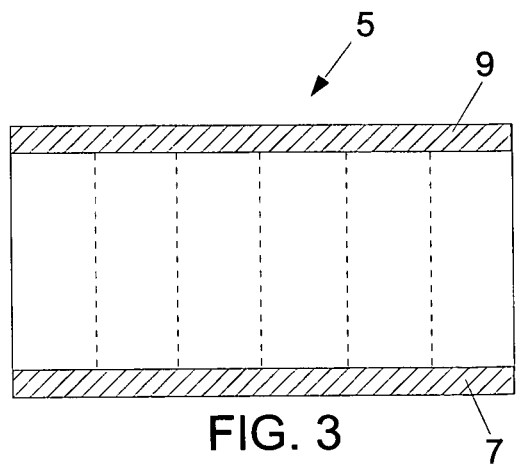
FIG. 3 shows an exemplary embodiment of a heat absorbing laser entrance element and a heat absorbing laser exit element positioned along respective laser entrance and exit sides of a glass sheet.
Figure 4:
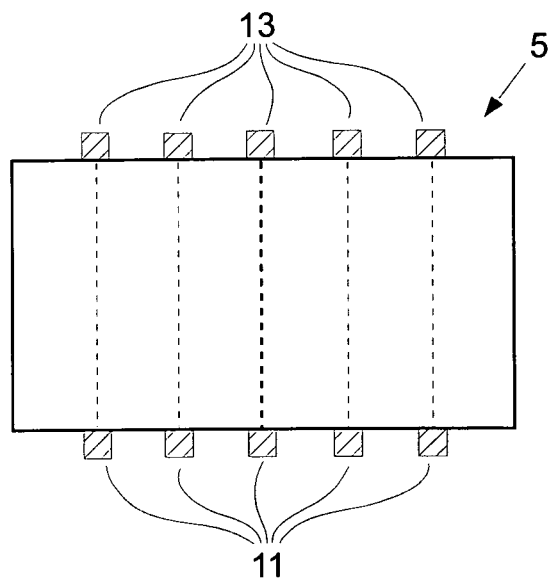
FIG. 4 shows an exemplary embodiment of heat absorbing laser entrance and exit elements associated with a glass sheet.

FIG. 3 shows a top view of an exemplary embodiment of a laser entrance element and laser exit element positioned along two sides of a glass sheet. Accordingly, as laser entrance element 7 is positioned along the side of the glass sheet 5 where the laser beam will begin the scribe or enter the glass sheet, i.e., positioned at the beginning of the scribe lines (shown in phantom) and a laser exit element 9 is positioned along the side of the glass sheet 5 where the laser beam will end the scribe or exit the glass sheet, i.e., positioned at the end of the scribe lines. FIG. 4 shows a top view of another exemplary embodiment of the subject invention having a plurality of laser entrance elements positioned along two sides of the glass sheet. As such, a plurality of laser entrance elements 11 is positioned along the side of the glass sheet 5 where the laser beam will begin the scribe or enter the glass sheet, i.e., positioned at the beginning of a scribe line and a plurality of laser exit elements 13 is positioned along the side of the glass sheet 5 where the laser beam will end the scribe or exit the glass sheet, i.e., positioned at the end of a scribe line. Of course, the laser entrance and exit elements may be positioned elsewhere in addition to or in place of the laser beam entrance and exit areas shown in FIGS. 3 and 4. Furthermore, it will be apparent that both a laser entrance and a laser exit element may not be required, depending on the configuration of the scribe line. For example, a scribe line in the shape of a circle may only require one laser element.

Figure 5:
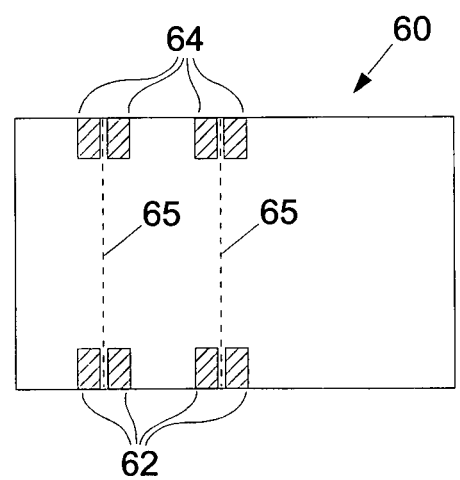
FIG. 5 is an exemplary embodiment of a subject glass precursor sheet holder having heat absorbing laser entrance and exit elements.

In those embodiments where the laser entrance and exit elements are positioned on the top or laser scribe side of the glass sheet, the entrance and exit elements will be positioned to facilitate scribing of the glass. In other words, the entrance and exit elements will be positioned such that they do not interfere with the laser beam as it scribes the glass sheet. FIG. 5 shows a top view of such an embodiment where the laser entrance elements 62 and laser exit elements 64 are positioned on top of the glass sheet 60, but do not lie on top of, or cover, the areas of the glass sheet that correspond to the proposed laser scribe lines 65.

A feature of the subject laser entrance and exit elements is that they absorb heat. More specifically, the laser entrance and exit elements absorb heat produced by the laser beam at the entrance and exit of the glass precursor sheet. That is, the laser entrance and exit elements have good thermal conductivity and usually have thermal conductivity better than the glass sheet with which it is being used. Accordingly, the laser entrance and exit elements may be made from a variety of materials that absorb heat and typically the material is inert or substantially inert, i.e., will not leach or otherwise interfere with the glass. Representative materials include, but are not limited to, glass, aluminum, copper and any combination thereof. The laser entrance and exit elements may be made entirely of the heat absorbing material or may be partially made from the heat absorbing material, e.g., the heat absorbing material(s) may be a coating over another material, etc.

Figure 6:
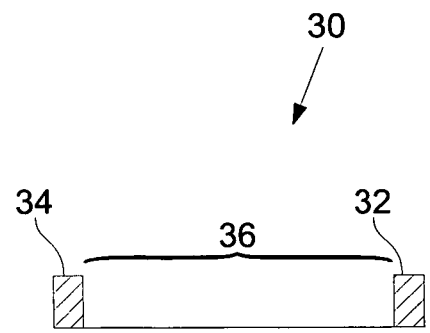
FIG. 6 is an exemplary embodiment of heat absorbing laser entrance and exit elements positioned on a scribe surface of a glass sheet, where the elements do not interfere with the scribe line.

The dimensions of the laser entrance and exit elements will vary depending on a variety of factors, including, but not limited to, the dimensions of the glass sheet, the type of laser used, and the like. Typically, a laser entrance element and exit element will be dimensioned to have about the same thickness as the glass sheet with which it is being used, i.e., the glass sheet being scribed. The dimensions will also vary according to the particular configuration of the laser entrance and exit elements. In certain embodiments, the laser entrance element and exit element may have about the same thickness as the glass sheet being scribed and may be about 4.5 to about 5.5 mm$^2$. These dimensions are exemplary only and may vary as appropriate. In certain embodiments, individual laser entrance and laser exit elements are positioned adjacent the area of the glass sheet where the laser beam will enter and exit. In certain other embodiments, the glass sheet is positioned in a glass sheet holder having laser entrance and exit elements, i.e., the laser entrance and exit elements are configured as a unitary piece configured to receive a glass sheet. FIG. 6 shows a cross section of an exemplary embodiment of such a glass sheet holder 30 having laser entrance element 32 and laser exit element 34 operatively associated therewith. A glass sheet is positioned in an area 36 of the glass sheet holder 30 such that the areas of the glass sheet where the laser beam is to enter and exit the glass sheet are adjacent the entrance element 32 and exit element 34.

In such an embodiment employing laser entrance and exit elements to absorb heat produced by the laser, once the elements are operatively positioned adjacent to the areas of the glass sheet corresponding to the entrance and exit areas of the laser beam, a laser scribes at least one scribe line in the glass sheet in a manner similar to the above described embodiment, except that there is no reduction of the laser power. More specifically, a laser having a substantially constant power emits a laser beam which scribes at least one laser scribe line into the glass sheet. By way of example and not limitation, using a $CO_2$ laser and a glass sheet having a width ranging from about 145 mm to about 155 mm, a length ranging from about 145 mm to about 170 mm and a thickness ranging from about 0.85 mm to about 1.30 mm, the power used to scribe the at least one scribe line, i.e., the working laser power, usually ranges from about 30 watts to about 45 watts, more usually the working laser power ranges from about 32 to about 38 watts and more usually ranges from about 35 to about 37 watts.

Figure 7:
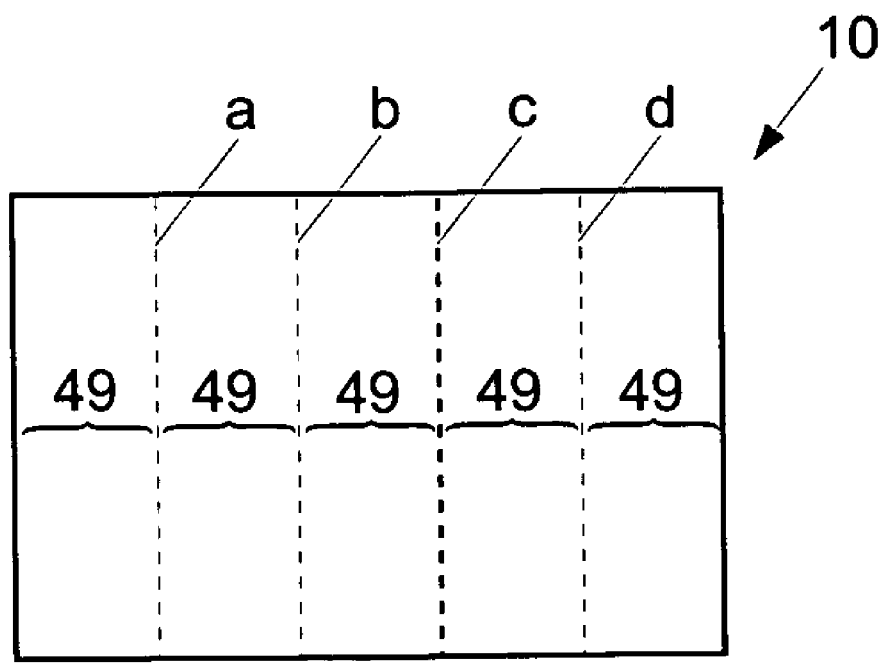
FIG. 7 shows an exemplary embodiment of a glass sheet having scribe lines therein.

Regardless of whether the glass is scribed using reduced laser power at the beginning and end of the scribe line or whether laser entrance and exit elements are used, the glass sheet is scribed to have one or more laser scribe lines such as laser scribe lines a, b, c and d of glass sheet 10 in FIG. 7. The scribe lines a, b, c and d are positioned to create glass pieces having a particular, i.e., intended, primary width 49.

Once one or more scribe lines have been made, the next step following the laser scribe of at least one scribe line involves breaking or singulating the glass sheet at the scribe lines to produce individual glass pieces having straight and smooth ends. More specifically, the edges of the singulated glass pieces produced at the scribe line are substantially free of protrusions at the ends. To singulate or break the glass sheet at the one or more scribe line, a force is applied to the scribe line. The force can be applied by any convenient means, including both manual and automatic means.

Figure 2:
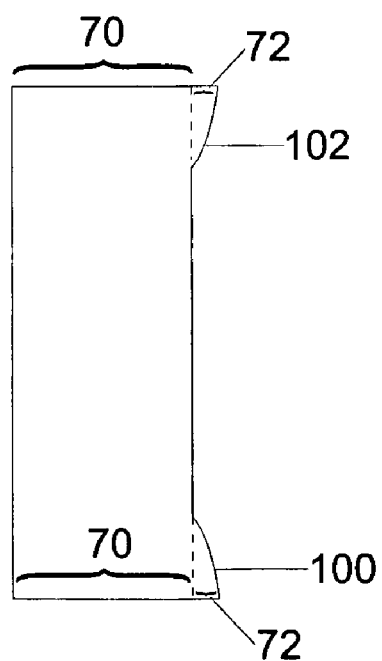
FIG. 2 shows prior art singulated laser scribed glass pieces having laterally extending, substantially planar edge protrusions on the ends of the laser scribed edges.
Figure 8:
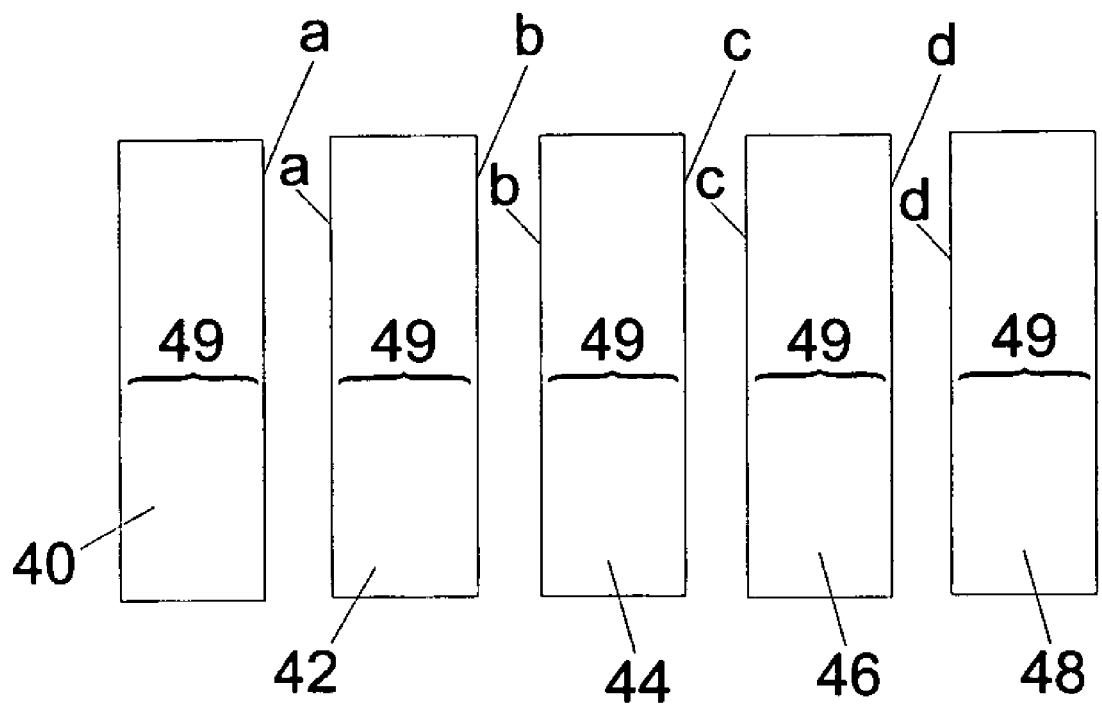
FIG. 8 shows an exemplary embodiment of the singulated glass substrates having straight and smooth ends substantially free of edge protrusions produced from the glass sheet of FIG. 5 according to the subject methods.

FIG. 8 shows the glass pieces 40, 42, 44, 46 and 48 of sheet 10 of FIG. 7 which have been singulated or broken apart from the glass sheet 10. As shown, the edge(s) of each piece of glass corresponding to a scribe line is straight and smooth and substantially free of any unintended, laterally extending, substantially planar edge protrusions, as described in reference to FIG. 2. By substantially free of the laterally extending, substantially planar edge protrusions is meant that any unintended bump or protrusion laterally extending from the edge of the scribe line does not extend the primary width 49 of the glass piece by more than about 0.4% to about 0.5%, usually not more than about 0.3% to about 0.4% and more usually not more than about 0.15% to about 0.3%. In other words, the edge(s) of the glass made by laser scribing the glass and singulating the glass at the scribe line is free from unintended laterally extending, planar curves, bends, angles or irregularities and the ends. For example, in those embodiments where the singulated pieces of glass have a primary width of about 25 mm, a length of about 75 mm and a thickness of about 1 mm, the width will usually not exceed about 200 microns more than 25 mm at the ends of the scribed edges, usually will not exceed about 100 to about 200 microns more than 25 mm and more usually will not exceed about 50 to about 100 microns more than 25 mm. For example, edge a of piece 40, edges a and b of piece 42, edges b and c of piece 44, edges c and d of piece 46 and edge d of piece 48 all correspond to scribe lines and all are straight and smooth substantially free of edge protrusions. However, if any edge protrusions were positioned thereon, the edge protrusion will not extend the primary width 49 of the glass piece by more than about 0.4% to about 0.5%, usually not more than about 0.3% to about 0.4% and more usually not more than about 0.15% to about 0.3%.

Glass Substrates

Also provided by the subject invention are glass substrates produced from the above described methods. In other words, the subject invention also includes laser scribed glass substrates having straight and smooth ends substantially free of edge protrusions, where such substrates are suitable for use with biopolymeric microarrays.

FIG. 9A shows a top view of an exemplary glass substrate according to the subject methods and FIGS. 9B and 9C show an enlarged view of the edges of the glass substrate of FIG. 9A. As shown in FIG. 9A, laser scribed glass substrate 50 has at least one laser scribed edge 52, where laser scribed edge 52 has ends 52a and 52b, corresponding to the entrance and exit points of the laser beam used to scribe the glass, i.e., the beginning and ending of the scribe line. A feature of the subject glass substrates is that the ends of the laser scribed glass, more specifically the ends of the laser scribed line corresponding to the entrance and exit points of the laser beam used to scribe the glass, are straight and smooth and substantially free of edge protrusions. FIG. 9B shows an enlarged view of end 52a of edge 52. As shown, end 52a is straight and smooth and substantially free of edge protrusions. Likewise, FIG. 9C shows an enlarged view of end 52b of edge 52. As shown, end 52b is straight and smooth and substantially free of edge protrusions.

Figures 10A, 10B:
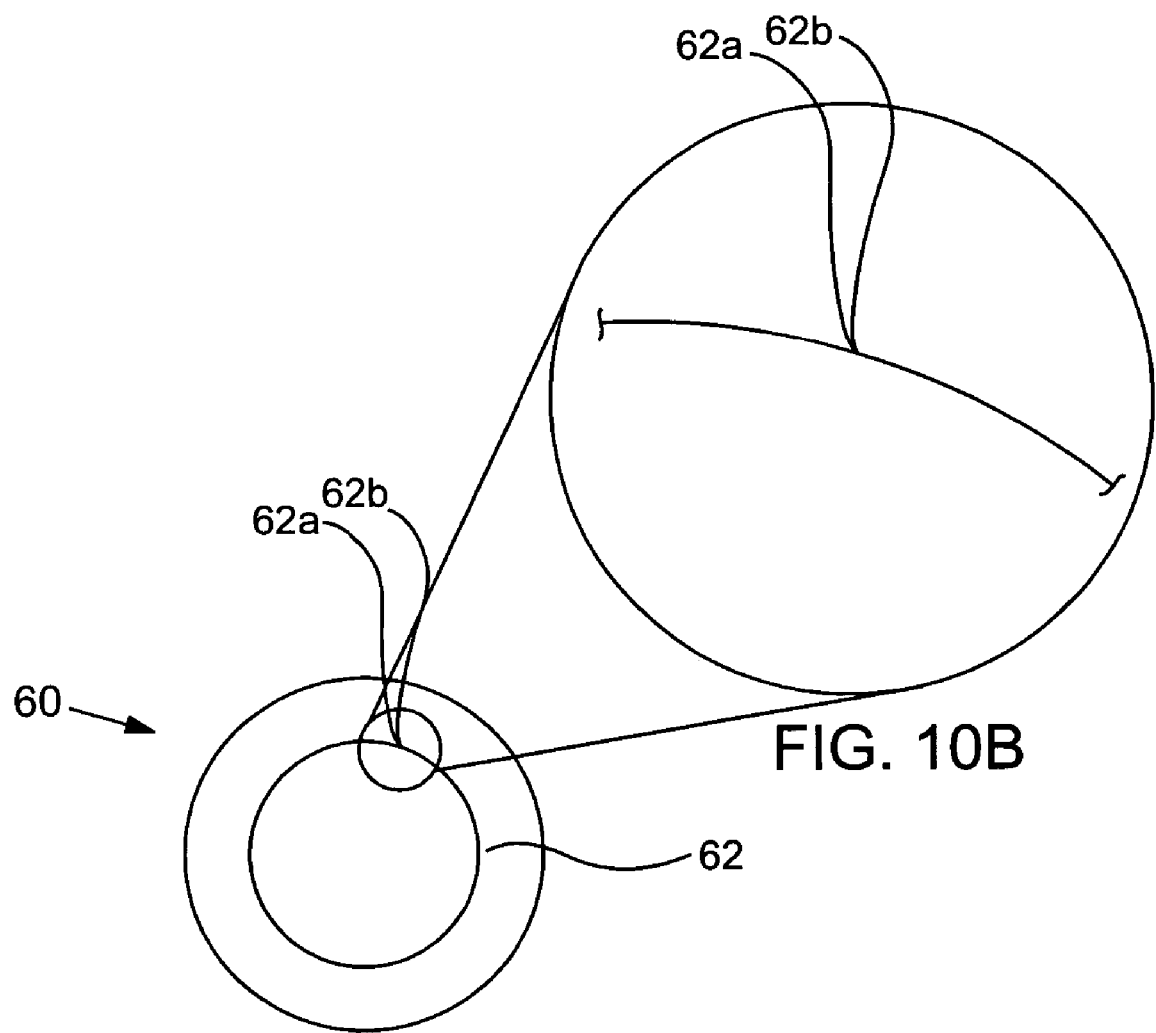
FIG. 10A shows and exemplary embodiment of a singulated glass piece made according to the subject invention having a circular scribe line.
FIG. 10B is an enlarged view of the straight and smooth ends that are substantially free of edge protrusions of the singulated glass piece of FIG. 10A.

FIG. 10A shows a top view of an exemplary circular glass piece having a circular line scribed therein according to the subject methods to provide a donut-like shape and FIG. 10B shows an enlarged view of the edges of the circular scribe line of FIG. 10A. As shown in FIG. 10A, laser scribed glass piece 60 has at least one laser scribed edge 62, where laser scribed edge 62 has ends 62a and 62b, corresponding to the entrance and exit points of the laser beam used to scribe the glass, i.e., the beginning and ending of the scribe line. As shown, the ends of the laser scribed glass, more specifically the ends of the laser scribed line corresponding to the entrance and exit points of the laser beam used to scribe the glass, are appropriately curved and smooth and substantially free of edge protrusions. FIG. 10B shows an enlarged view of ends 62a and 62b of edge 62. As shown, ends 62a and 62b are curved and smooth and substantially free of edge protrusions.

The glass substrates of the subject invention may assume a variety of shapes and sizes. Thus, the subject glass substrates may take a variety of shapes ranging from simple to complex. For example, the subject laser scribed glass may have a rectangular, square, circular, elliptical, oval, oblong or disc configuration. In other embodiments, the laser scribed glass may assume an irregular shape.

Similarly, the size of the glass substrates may vary. In certain embodiments of the glass substrates, the glass substrates assume a rectangular shape (of course other shapes are possible as well). Accordingly, such a rectangular-shaped laser scribed glass substrate may have a width ranging from about 10 mm to about 40 mm, usually from about 15 mm to about 35 mm and more usually from about 20 mm to about 30 mm, a length ranging from about 60 mm to about 90 mm, usually from about 65 mm to about 85 mm and more usually from about 70 mm to about 80 mm and a thickness ranging from about 0.85 mm to about 1.30 mm, usually from about 0.85 mm to about 1.15 mm and more usually from about 0.90 mm to about 1.15 mm. These dimensions are, of course, exemplary and may vary as required.

Biopolymeric Microarrays

As mentioned above, the singulated glass pieces having straight and smooth edges substantially free of edge protrusions made according to the subject methods may be used for a variety of applications. In one such application, the singulated glass pieces made according to the present invention are used as substrates, upon which one or more arrays or patterns of biopolymeric materials are attached to the substrate surface. In other words, at least one array of probes is deposited on a surface of a singulated glass piece having straight and smooth ends substantially free of edge protrusions. Such microarrays or "biochips" (also known as arrays) find use in a variety of applications, including gene expression analysis, drug screening, nucleic acid sequencing, mutation analysis, and the like. These microarrays include a plurality of ligands or molecules or probes (i.e., binding agents) deposited onto the surface of a subject laser scribed glass piece made according to the subject invention in the form of an "array" or pattern.

The subject microarrays include at least two distinct polymers that differ by monomeric sequence covalently attached to different and known locations on the substrate surface. Each distinct polymeric sequence of the array is typically present as a composition of multiple copies of the polymer on a substrate surface, e.g. as a spot on the surface of the substrate. The number of distinct polymeric sequences, and hence spots or similar structures, present on the array may vary, but is generally at least 2, usually at least 5 and more usually at least 10, where the number of different spots on the array may be as a high as 50, 100, 500, 1000, 10,000 or higher, depending on the intended use of the array. The spots of distinct polymers present on the array surface are generally present as a pattern, where the pattern may be in the form of organized rows and columns of spots, e.g. a grid of spots, across the substrate surface, a series of curvilinear rows across the substrate surface, e.g. a series of concentric circles or semi-circles of spots, and the like. The density of spots present on the array surface may vary, but will generally be at least about 10 and usually at least about 100 spots/cm$^2$, where the density may be as high as $10^6$ or higher.

In the broadest sense, the arrays of the subject invention are arrays of polymeric or biopolymeric ligands or molecules, i.e., binding agents, where the polymeric binding agents may be any of: peptides, proteins, nucleic acids, polysaccharides, synthetic mimetics of such biopolymeric binding agents, etc. In many embodiments of interest, the microarrays are arrays of nucleic acids, including oligonucleotides, polynucleotides, cDNAs, mRNAs, synthetic mimetics thereof, and the like.

The microarrays may be produced by a number of different methods, where such methods are known in the art. In all such methods, a subject glass substrate is first provided. After the provision of a subject substrate, arrays or patterns of ligands are produced on a surface of a provided substrate using any convenient method, e.g., by depositing pre-made ligands on the substrate surface or growing ligands on the substrate surface, e.g., by depositing ligand precursors such as activated monomers on the substrate surface. For example, DNA arrays may be prepared manually by spotting DNA onto the surface of a substrate with a micro pipette. See Khrapko et al., DNA Sequence (1991) 1:375–388, the disclosure of which is herein incorporated by reference. Alternatively, the dot-blot approach, as well as the derivative slot-blot approach, may be employed in which a vacuum manifold transfers aqueous DNA samples from a plurality of wells to a substrate surface. In yet another method of producing arrays of biopolymeric molecules, a pin is dipped into a fluid sample of the biopolymeric compound and then contacted with the substrate surface. By using a plurality or array of pins, one can transfer a plurality of samples to the substrate surface at the same time. Alternatively, an array of capillaries can be used to produce biopolymeric arrays. See e.g., WO 95/35505, the disclosure of which is herein incorporated by reference. In another method of producing biopolymeric arrays, arrays of biopolymeric agents are "grown" on the surface of a substrate in discreet regions. See e.g., U.S. Pat. No. 5,143,854 and Fodor et al., Science (1991) 251:767–773, the disclosures of which are herein incorporated by reference.

Figure 11:
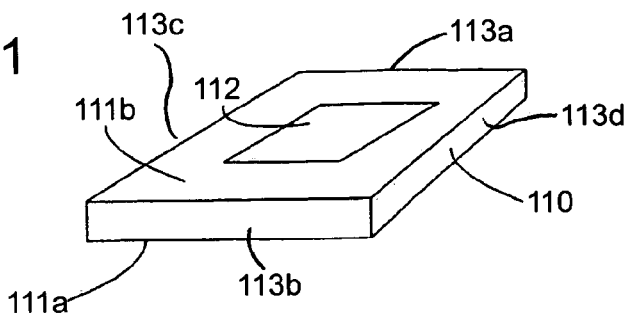
FIG. 11 shows an exemplary laser scribed glass substrate produced according to the subject methods and carrying an array.
Figure 12:
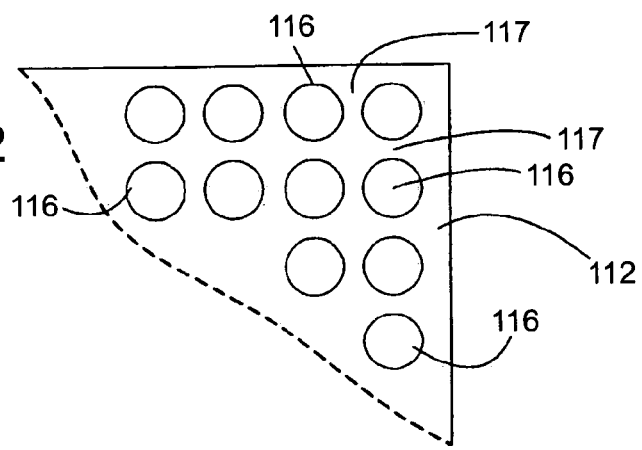
FIG. 12 shows an enlarged view of a portion of FIG. 11 showing spots or features.
Figure 13:
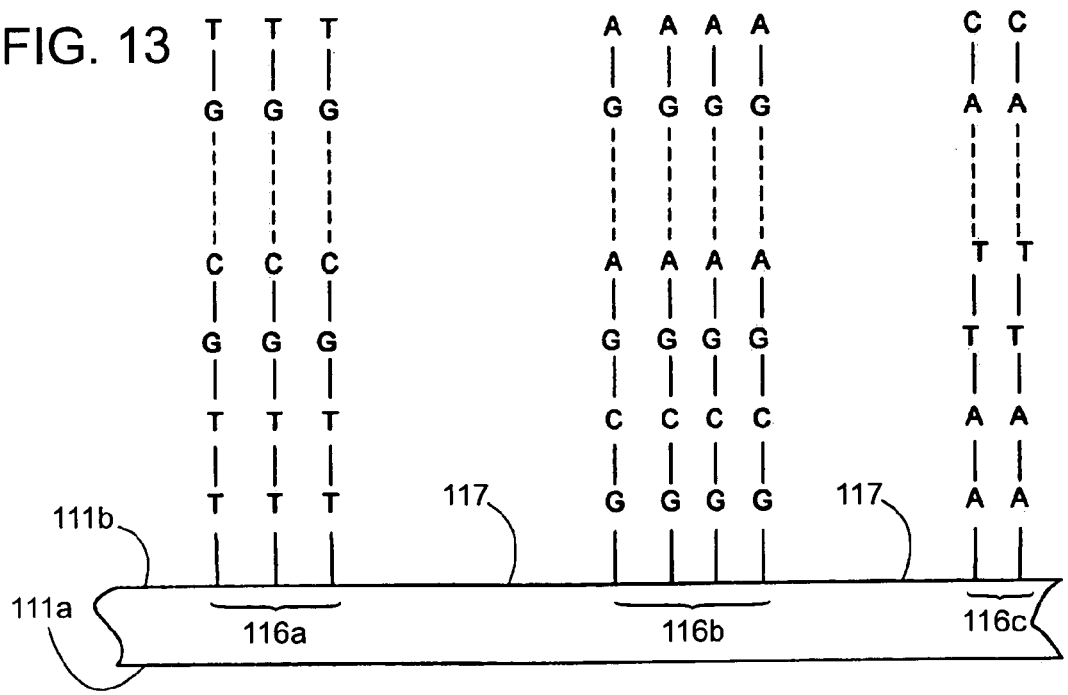
FIG. 13 is an enlarged view of a portion of the glass substrate of FIG. 12.

Referring first to FIGS. 11–13, the biopolymeric arrays of the present invention use a laser scribed glass substrate produced according to the subject invention 110 and which carry an array 112 disposed on a rear surface 111b of substrate 110. That is, the glass substrates produced according to the subject methods and used herein as substrates for microarrays have straight and smooth ends and are substantially free of edge protrusions. It will be appreciated though, that more than one array (any of which are the same or different) may be present on rear surface 111b, with or without spacing between such arrays. The one or more arrays 112 cover only a portion of the rear surface 111b, with regions of the rear surface 111b adjacent the opposed sides 113c, 113d and leading end 113a and trailing end 113b of slide 110, not being covered by any array 112. A front surface 111a of the substrate 110 does not carry any arrays 112. Each array 112 can be designed for testing against any type of sample, whether a trial sample, reference sample, a combination of them, or a known mixture of biopolymers such as polynucleotides. Glass substrate 110 may be of any shape, as mentioned above.

As mentioned above, array 112 contains multiple spots or features 116 of biopolymers, e.g., in the form of polynucleotides. As mentioned above, all of the features 116 may be different, or some or all could be the same. The interfeature areas 117 could be of various sizes and configurations. Each feature carries a predetermined biopolymer such as a predetermined polynucleotide (which includes the possibility of mixtures of polynucleotides). It will be understood that there may be a linker molecule (not shown) of any known types between the rear surface 111b and the first nucleotide.

Regardless of how the microarrays are produced or fabricated, in using the microarrays a sample containing at least one analyte or component of interest is then contacted with the microarray such that the analyte of interest in the sample binds or associates with a probe or ligand on the substrate surface to form a binding complex, i.e., an interaction between an analyte and a probe is formed. Typically, the analyte will be labeled, e.g., with fluorescent marker, radioactive marker and the like such that the binding complex can then be detected using any suitable means. Information regarding the analyte and/or the microarray is thus derived from the aforementioned detection steps.

More specifically, following receipt by a user of a microarray made by a method of the present invention (using laser scribed glass substrates having straight and smooth ends substantially free of edge protrusion), the microarray will typically be exposed to a sample (for example, a fluorescently labeled analyte, e.g., protein containing sample) and the array then read or interrogated. Reading of the array may be accomplished by illuminating the array and reading the location and intensity of resulting fluorescence at each feature of the array. For example, a scanner may be used for this purpose which is similar to the GENEARRAY scanner available from Agilent Technologies, Palo Alto, Calif. Other suitable apparatus and methods are described in U.S. patent application Ser. Nos.: Ser. No. 09/846,125 "Reading Multi-Featured Arrays" by Dorsel et al.; and Ser. No. 09/430,214 "Interrogating Multi-Featured Arrays" by Dorsel et al., the disclosures of which are herein incorporated by reference. However, microarrays may be read by any other method or apparatus than the foregoing, with other reading methods including other optical techniques (for example, detecting chemiluminescent or electroluminescent labels) or electrical techniques (where each feature is provided with an electrode to detect hybridization at that feature in a manner disclosed in U.S. Pat. No. 6,221,583, the disclosure of which is herein incorporated by reference, and elsewhere). Results from the reading may be raw results (such as fluorescence intensity readings for each feature in one or more color channels) or may be processed results such as obtained by rejecting a reading for a feature which is below a predetermined threshold and/or forming conclusions based on the pattern read from the array (such as whether or not a particular target sequence may have been present in the sample). The results of the reading (processed or not) may be forwarded (such as by communication) to a remote location if desired, and received there for further use (such as further processing), as will be described in greater detail below.

Before being placed in a scanner or other apparatus for reading, microarrays of the present invention may first be inserted into a holder, such as described in pending U.S. patent application Ser. No. 09/761,966 entitled "Arrays and Their Reading", by Schembri et al., incorporated herein by reference. With the glass substrates having straight and smooth ends substantially free of edge protrusions, the risk of edges of such substrates cutting into the holder (which may be made of plastic) and removing portions of it during insertion into the holder, is reduced. Reducing the presence of any such removed portions may reduce the chances of them contaminating the array or the reader optics and thereby causing errors during the reading. By "plastic" in this context is referenced any organic polymer of high molecular weight which can retain its shape so as to hold the substrate.

As noted above, the subject microarrays may be used in a variety of analyte detection applications. Specific analyte detection applications of interest include hybridization assays in which the microarrays, e.g., nucleic acid microarrays, of the subject invention are employed. In these assays, a sample including analyte, e.g., a sample of target nucleic acids, is first prepared, where preparation may include labeling of the analyte, e.g., labeling the target nucleic acids, with a label, e.g., a member of signal producing system. Following sample preparation, the sample is contacted with the microarray under hybridization conditions, whereby complexes are formed between the analyte, e.g., the target nucleic acids, that are complementary to probe sequences attached to the array surface. Hybridization involving nucleic acids generally takes from about 30 minutes to about 24 hours, but may vary as required and the hybridization assay is usually performed at a temperature of at least about 25° C. to about 70° C., usually about 30° C. to about 65° C. and more usually about 35° C. to about 65° C.

The presence of hybridized complexes is then detected. Specific hybridization assays of interest which may be practiced using the subject arrays include: gene discovery assays, differential gene expression analysis assays; nucleic acid sequencing assays, and the like. Patents and patent applications describing methods of using arrays in various applications include: U.S. Pat. Nos. 5,143,854; 5,288,644; 5,324,633; 5,432,049; 5,470,710; 5,492,806; 5,503,980; 5,510,270; 5,525,464; 5,547,839; 5,580,732; 5,661,028; 5,800,992; the disclosures of which are herein incorporated by reference.

Where the subject microarrays are microarrays of polypeptide binding agents, e.g., protein arrays, specific applications of interest include analyte detection/proteomics applications, including those described in U.S. Pat. Nos. 4,591,570; 5,171,695; 5,436,170; 5,486,452; 5,532,128; and 6,197,599; as well as published PCT application Nos. WO 99/39210; WO 00/04832; WO 00/04389; WO 00/04390; WO 00/54046; WO 00/63701; WO 01/14425; and WO 01/40803; the disclosures of which are herein incorporated by reference.

As noted above, certain embodiments include a step of transmitting data from at least one of the detecting and deriving steps, as described above, to a remote location. By "remote location" is meant a location other than the location at which the array is present and hybridization occur. For example, a remote location could be another location (e.g. office, lab, etc.) in the same city, another location in a different city, another location in a different state, another location in a different country, etc. As such, when one item is indicated as being "remote" from another, what is meant is that the two items are at least in different buildings, and may be at least one mile, ten miles, or at least one hundred miles apart. "Communicating" information means transmitting the data representing that information as electrical signals over a suitable communication channel (for example, a private or public network). "Forwarding" an item refers to any means of getting that item from one location to the next, whether by physically transporting that item or otherwise (where that is possible) and includes, at least in the case of data, physically transporting a medium carrying the data or communicating the data. The data may be transmitted to the remote location for further evaluation and/or use. Any convenient telecommunications means may be employed for transmitting the data, e.g., facsimile, modem, internet, etc.

Kits

Finally, kits which include the subject laser scribed glass are provided. The subject kits at least include one or more glass substrates according to the subject invention, i.e., having straight and smooth edges, substantially free of edge protrusions. Typically, a plurality of subject laser scribed glass substrates is included.

The subject kits may also include one or more microarrays, usually a plurality of microarrays, for example the subject kits may include one or more microarrays associated with the subject laser scribed glass substrates. The kits may further include one or more additional components necessary for carrying out an assay (analyte detection assay) using the microarrays, such as sample preparation reagents, buffers, labels, and the like. As such, the kits may include one or more containers such as vials or bottles, with each container containing a separate component for the assay, and reagents for-carrying out an array assay such as a nucleic acid hybridization assay or the like. The kit may also include a denaturation reagent for denaturing the analyte, buffers such as hybridization buffers, wash mediums, enzyme substrates, reagents for generating a labeled target sample such as a labeled target nucleic acid sample, negative and positive controls and written instructions for using the subject laser scribed glass or microarrays for carrying out an array based assay. The instructions may be printed on a substrate, such as paper or plastic, etc. As such, the instructions may be present in the kits as a package insert, in the labeling of the container of the kit or components thereof (i.e., associated with the packaging or sub-packaging) etc. In other embodiments, the instructions are present as an electronic storage data file present on a suitable computer readable storage medium, e.g., CD-ROM, diskette, etc.

It is evident from the above description and discussion that the above described invention provides an easy and effective way to produce glass substrates. The above described invention provides a number of advantages, including ease of use and the ability to scribe glass without having substantial protrusions on the ends of the scribe lines. As such, the subject invention represents a significant contribution to the art.

All publications and patents cited in this specification are herein incorporated by reference as if each individual publication or patent were specifically and individually indicated to be incorporated by reference. The citation of any publication is for its disclosure prior to the filing date and should not be construed as an admission that the present invention is not entitled to antedate such publication by virtue of prior invention.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

What is claimed is:

1. A method for producing a glass substrate, said method comprising:
    (a) providing a glass sheet suitable for laser scribing,
    (b) positioning a laser entrance element adjacent the beginning of at least one scribe line and a laser exit element positioned adjacent the ending of at least one scribe line,
    (c) scribing at least one laser scribe line in said glass sheet with a laser, whereby heat generated from said laser is absorbed by said laser entrance element and said laser exit element,
    (d) singulating said scribed glass at the formed said at least one laser scribe line to produce at least one laser scribed glass substrate, whereby each of said laser scribed glass substrates comprises straight and smooth ends substantially free of edge protrusions; and
    producing a biopolymeric array on said at least one of said laser scribed glass substrates.

2. The method according to claim 1, wherein said laser entrance element and said laser exit element are positioned besides edges of said glass sheet.

3. The method according to claim 1, wherein said laser entrance element and said laser exit element are positioned on a surface of said glass sheet, wherein said surface is to be scribed by said laser.

4. The method according to claim 1, wherein said laser entrance element and said laser exit element are positioned on a surface of said glass sheet, wherein said surface is not to be scribed by said laser.

5. The method according to claim 1, wherein each of said laser entrance element and said laser exit element comprises a material selected from the group consisting of glass, aluminum and copper.

6. The method according to claim 1, wherein said laser scribes said glass sheet with a laser power ranging from about 30watts to about 45 watts.

7. The method according to claim 1, wherein said laser generates a laser beam having a wavelength ranging from about 10.57 microns about 10.63 microns.

8. The method according to claim 1, wherein said laser is a $CO_2$ laser.

9. The method according to claim 1, further comprising: exposing said biopolymeric array to a sample; and reading said biopolymeric array following said exposure to obtain a result from said reading.

10. The method according to claim 9, wherein said result of said reading is forwarded to a remote location.

* * * * *